United States Patent
Naito et al.

(10) Patent No.: US 9,014,268 B2
(45) Date of Patent: Apr. 21, 2015

(54) VIDEO ENCODER AND ITS DECODER

(75) Inventors: Sei Naito, Fujimino (JP); Tomonobu Yoshino, Fujimino (JP)

(73) Assignee: KDDI R&D Laboratories Inc., Saitama (JP)

( * ) Notice: Subject to any disclaimer, the term of this patent is extended or adjusted under 35 U.S.C. 154(b) by 1046 days.

(21) Appl. No.: 12/727,278

(22) Filed: Mar. 19, 2010

(65) Prior Publication Data
US 2010/0246684 A1 Sep. 30, 2010

(30) Foreign Application Priority Data

Mar. 31, 2009 (JP) ................................ 2009-085660

(51) Int. Cl.
- H04N 7/50 (2006.01)
- H04N 19/567 (2014.01)
- H04N 19/176 (2014.01)
- H04N 19/119 (2014.01)
- H04N 19/147 (2014.01)
- H04N 19/103 (2014.01)

(Continued)

(52) U.S. Cl.
CPC ........... H04N 19/567 (2014.11); H04N 19/176 (2014.11); H04N 19/119 (2014.11); H04N 19/147 (2014.11); H04N 19/103 (2014.11); H04N 19/14 (2014.11); H04N 19/53 (2014.11)

(58) Field of Classification Search
CPC ... H04N 19/103; H04N 19/119; H04N 19/14; H04N 19/147; H04N 19/176; H04N 19/53; H04N 19/567
USPC .................................................... 375/240.16
See application file for complete search history.

(56) References Cited

U.S. PATENT DOCUMENTS 5,576,767 A * 11/1996 Lee et al. ................. 375/240.14
2003/0035477 A1* 2/2003 Sekiguchi et al. ....... 375/240.08

(Continued)

FOREIGN PATENT DOCUMENTS

| JP | 7-264594 A | 10/1995 |
|---|---|---|
| JP | 2006-519565 A | 8/2006 |
| JP | 2006339774 | 12/2006 |

OTHER PUBLICATIONS

"Efficient coding scheme for super high definition video based on extending H.264 high profile"; Visual Communications and Image Processing 2006, Proc. of SPIE-IS&T Electronic imaging, SPIE vol. 6077, 607727 (NAITO).*

(Continued)

*Primary Examiner* — Mehrdad Dastouri
*Assistant Examiner* — Mohammed Rahaman
(74) *Attorney, Agent, or Firm* — Westman, Champlin & Koehler, P.A.

(57) ABSTRACT

A video encoder according to the present invention improves coding efficiency of a super high definition video by setting an area of MB size and optimally determining size of the area. A locally decoded image (a) is subjected to frequency analysis in a frequency analyzing unit. Based on the result, an area setting unit sets a local area in a picture to which the maximum MB size is applied. An area boundary correcting unit corrects an area boundary in accordance with a representative motion characteristic, and an N-value calculating unit determines the maximum MB size (N×N) of each area based on a result of encoding a neighboring picture. The area setting and the N-value calculation are performed step by step.

5 Claims, 11 Drawing Sheets

(51) Int. Cl.
*H04N 19/14* (2014.01)
*H04N 19/53* (2014.01)

(56) References Cited

U.S. PATENT DOCUMENTS

2003/0152147 A1* 8/2003 Akimoto et al. ......... 375/240.19
2006/0165163 A1* 7/2006 Burazerovic et al. .... 375/240.03

OTHER PUBLICATIONS

Ren et. al. "Computationally Efficient Mode Selection in H.264/AVC Video Coding"—2008 IEEE.*

Rejection Notice for Japanese Application No. 2009-085660, dated Jun. 25, 2012, 7 pages.
"H.264 High Profile—Improved Coding Scheme for Super High Definition Videos by Using H.264 High Profile Coding Framework with Extended Macroblock Size", A. Matsumura, S. Naito, R. Kawada, and A. Koike; vol. 61, No. 5, pp. 665-671.
"Efficient coding scheme for super high definition video based on extending H.264 high profile", S. Naito, A. Matsumura, A. Koike; Visual communications and Image Processing 2006, edited by John G. Apostolopoulos, Amir Said, Proc. of SPIE-IS&T Electronic Imaging, SPIE vol. 6077, 607727, c 2005 SPIE-IS&T . 0277-78X/05/$15; 9 pages.

* cited by examiner

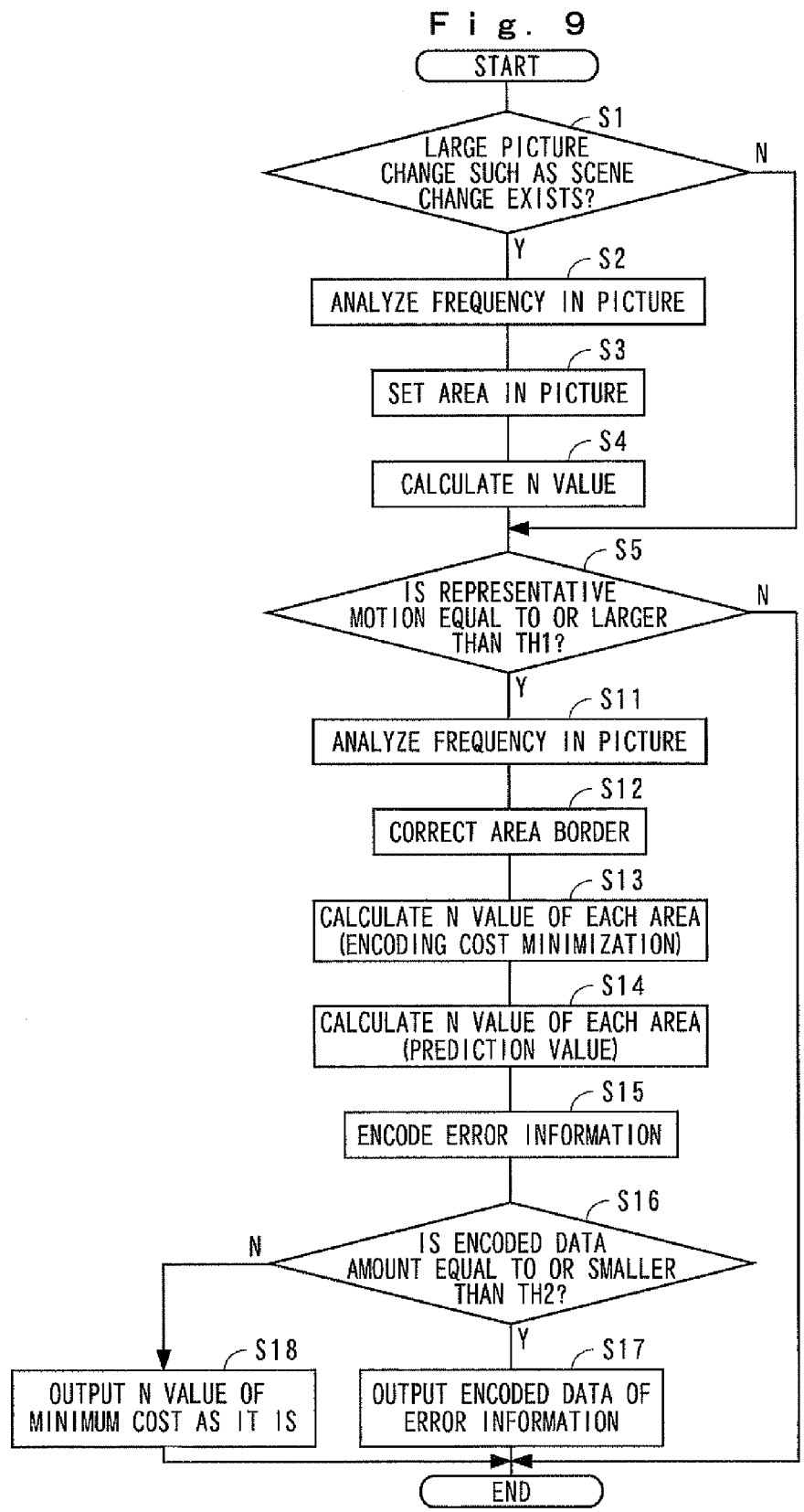

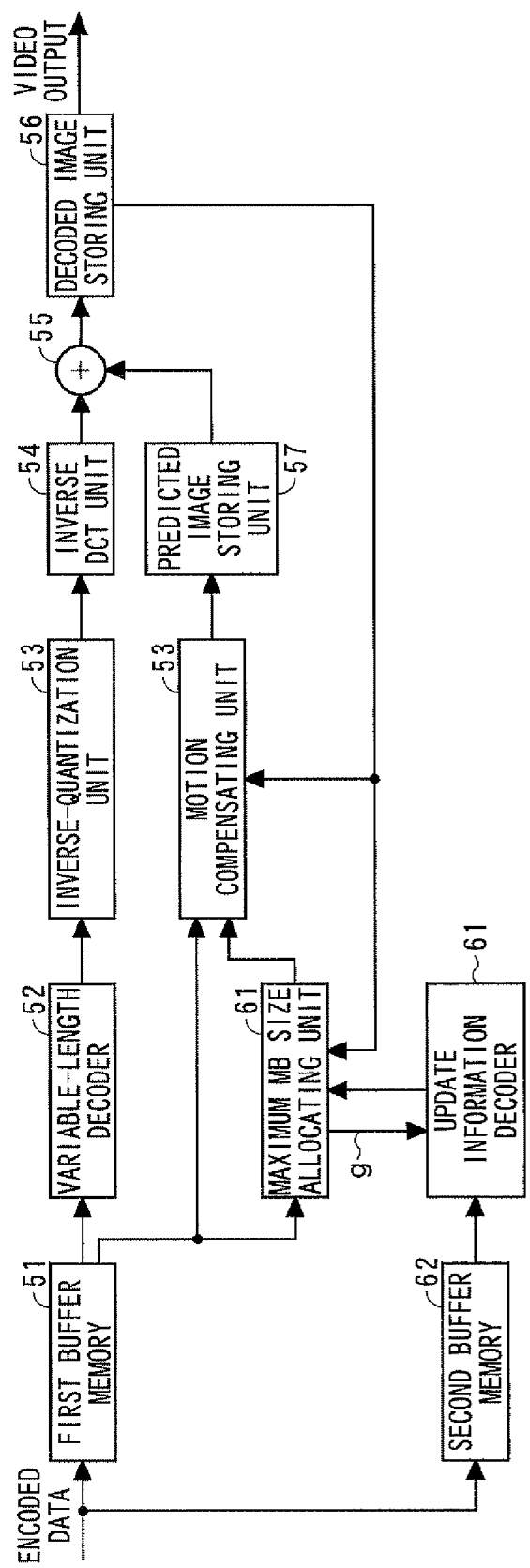

VIDEO ENCODER AND ITS DECODER

The present application is claims priority of Japanese Patent Application Serial No. 2009-085660, filed Mar. 31, 2009, the content of which is hereby incorporated by reference in its entirety.

BACKGROUND OF THE INVENTION

1. Field of the Invention

The present invention relates to a video encoder and its decoder and, more particularly, to a video encoder and its decoder realizing improvement in coding efficiency of a super high definition video by optimally determining division and size of a macroblock used for motion prediction.

2. Description of the Related Art

Conventionally, as a method of improving coding efficiency of a motion predicting unit in video encoding, a method of optimally determining the upper limit of the size of a macroblock (MB) used for motion prediction is described in, for example, Japanese Patent Application Laid-Open No. 2006-339774 and "Improved coding scheme for super high definition videos by using H.264 high profile coding framework with extended macroblock size", The Journal of the Institute of Image Information and Television Engineers, Vol. 61, No. 5, pp 665-673 (2007).

In Japanese Patent Application Laid-Open No. 2006-339774, a method of classifying the MB size into three categories of "large", "medium", and "small" is proposed. Considering rough tendency of the MB size in results of coding in the previous picture, when a usage ratio of the category "large" is higher than a first threshold and a usage ratio of the category "small" is lower than a second threshold, the upper limit of the MB size of the picture is increased. On the other hand, when the usage ratio of the category "large" is lower than the first threshold and the usage ratio of the category "small" is higher than the second threshold, the upper limit of the MB size of the picture is decreased.

A method of employing an MB size with small distortion obtained by using a distortion rate curve for use in rate control of an encoder as the maximum MB size is disclosed in the "Improved coding scheme for super high definition videos by using H.264 high profile coding framework with extended macroblock size", The Journal of the Institute of Image Information and Television Engineers, Vol. 61, No. 5, pp 665-673 (2007).

According to the conventional techniques, the maximum MB size to be applied to the picture can be roughly determined in consideration of tendency of the MB size in the result of coding in the previous picture.

However, as one of features of a super high definition video, it is known that a fluctuation in a local material characteristic is large. Consequently, in many cases, it is difficult to characterize a picture by one coding characteristic. When any of the categories of large, medium, and small limited by the maximum MB size is just allocated to a picture, a problem occurs such that an effective coding mode cannot be sufficiently covered.

SUMMARY OF THE INVENTION

An object of the present invention is to provide a video encoder and its decoder realizing improved coding efficiency of a super high definition video by optimally setting an area of an MB size and optimally determining the MB size of each area.

In order to achieve the object, this invention is characterized in that a video encoder capable of locally updating a maximum value of an MB size as a unit of motion-compensated prediction of an encoding process in a picture comprises an area setting unit which sets a local area in a picture to which a maximum MB size is applied and an N-value calculating unit which determines the maximum MB size (N×N) of each area set by the area setting unit, wherein the area setting and the N-value calculation are performed step by step.

The invention is further characterized in that the video encoder comprises an area border correcting unit which corrects a border of the area set by the area setting unit, wherein the area border correcting unit corrects the area border based on a representative motion characteristic.

The invention is further characterized in that in determination of a maximum MB size (N×N) of each area which is set, the N-value calculating unit calculates an N value by using at least one of frequency of occurrence of an MB coding mode corresponding to the area in a neighboring encoded image, a rate distortion characteristic of a DCT coefficient corresponding to the area in a neighboring encoded image, and a frequency spectrum of the area in the image.

The invention is further characterized in that a video decoder capable of locally updating a maximum value of an MB size as a unit of motion-compensated prediction of a decoding process in a picture comprises an area setting unit which sets a local area in a picture to which a maximum MB size is applied and an N-value calculating unit which determines the maximum MB size (N×N) of each area set by the area setting unit, wherein the area setting and the N-value calculation are performed step by step.

According to the invention, without generating side information, control of updating the maximum MB size in a picture can be performed with high precision. According to the invention, a moving image coded by an encoder can be decoded in consistency with the encoder.

According to the invention, while suppressing increase in side information, control of updating the maximum MB size in a picture can be performed with high precision. According to the invention, a moving image coded by the encoder can be decoded in consistency with the encoder.

BRIEF DESCRIPTION OF THE DRAWINGS

FIG. 9 is a flowchart showing operations of the fourth embodiment;

FIG. 10 is a block diagram showing a schematic configuration of an embodiment of a decoder of the invention; and FIG. 11 is a block diagram showing a concrete example of an update information decoder of the decoder.

DETAILED DESCRIPTION OF THE PREFERRED EMBODIMENTS

Figure 1:
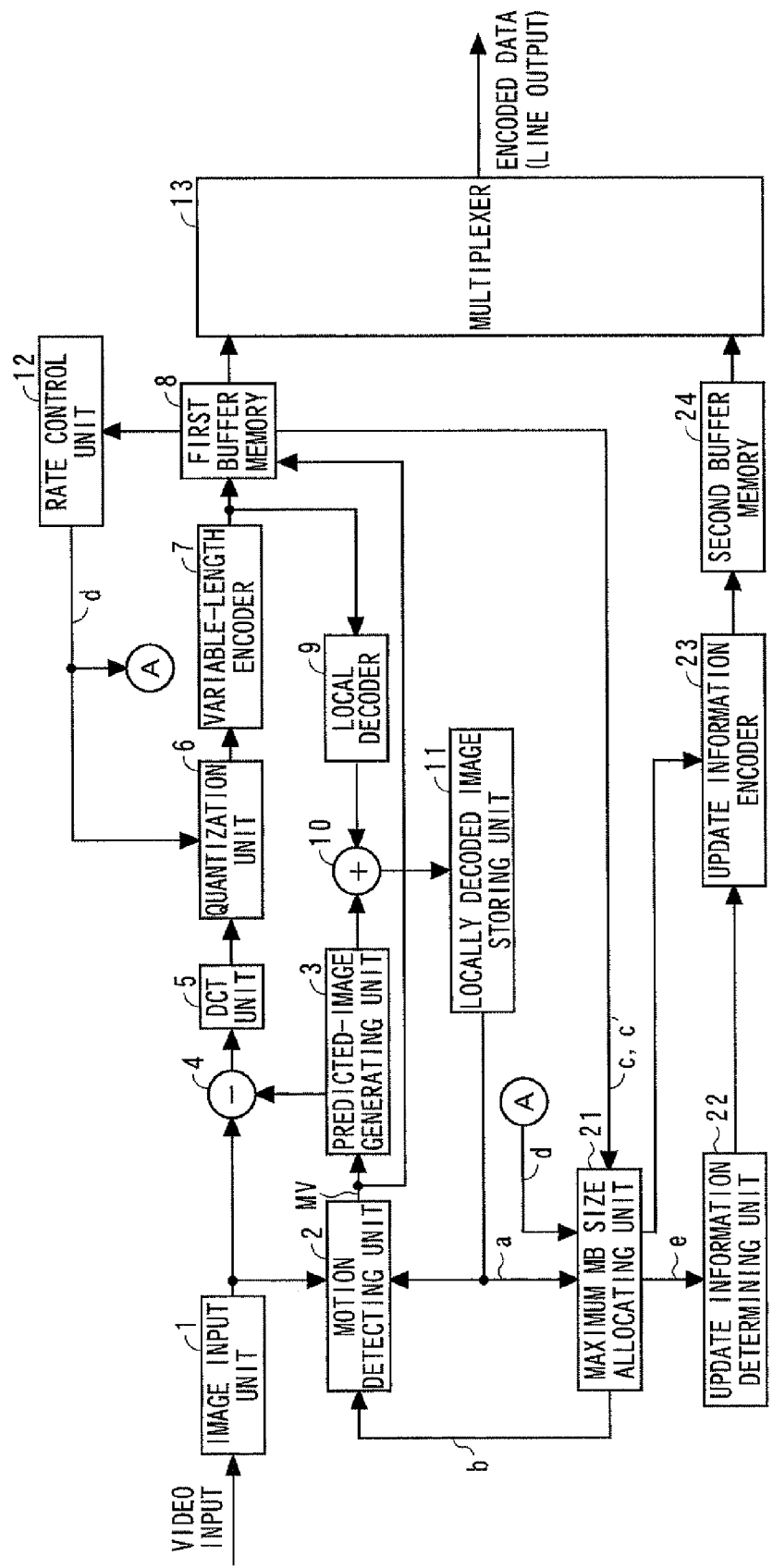
FIG. 1 is a block diagram showing a schematic configuration of an embodiment of an encoder of the present invention.

The present invention will be described in detail below with reference to the drawings. FIG. 1 is a schematic block diagram of an encoder to which the present invention is applied.

In the diagram, an input image as pixel data input to an image input unit 1 is transmitted to a motion detecting unit 2 and an error signal generating unit 4. The motion detecting unit 2 detects a motion of a locally decoded image (a) from a locally decoded image storing unit 11 in accordance with an MB size (b) provided from a maximum MB size allocating unit 21. A motion vector (MV) detected by the motion detecting unit 2 is transmitted to a predicted-image generating unit 3, and a predicted image is generated. The MV is transmitted also to a first buffer memory 8.

The error signal generating unit 4 calculates an error signal from the pixel data of the input image and pixel data of a predicted image, and the error signal is subjected to orthogonal transformation in a DCT unit 5. The orthogonally-transformed error signal is quantized by a quantization unit 6 and then subject to variable-length coding by a variable-length encoder 7. The data subjected to the variable-length encoding is temporarily stored in the first buffer memory 8 and sent to a local decoder 9. The data temporarily stored in the first buffer memory 8 is monitored by a rate control unit 12 and sent to a multiplexer 13. In the multiplexer 13, the data is multiplexed with side information from a second buffer memory 24 to be described below. The multiplexed data is output as encoded data to a line.

The variable-length-encoded data which is decoded by the local decoder 9 is added with the predicted image from the predicted image generating unit 3 in a locally decoded image generating unit 10, thereby generating a locally decoded image. The locally decoded image is temporarily stored in the locally decoded image storing unit 11. The rate control unit 12 monitors the first buffer memory 8, calculates an optimum quantization parameter based on the result of monitoring, and transmits the quantization parameter to the quantization unit 6 to control quantization operation of the quantization unit 6. The quantization parameter is transmitted also to the maximum MB size allocating unit 21.

The above functions are those of a conventional encoder. In the following, the functions of the maximum MB size allocating unit 21, an update information determining unit 22, an update information encoder 23, and a second buffer memory 24 as the main part of the present invention will be described. In the first to third embodiments, as will become clear from the following description, the decoder can perform decoding under the same conditions as those of the coding in the encoder without transmitting an N value (side information) related to the maximum MB size to the decoder side, so that the N value (side information) does not have to be transmitted to the decoder.

Figure 2:
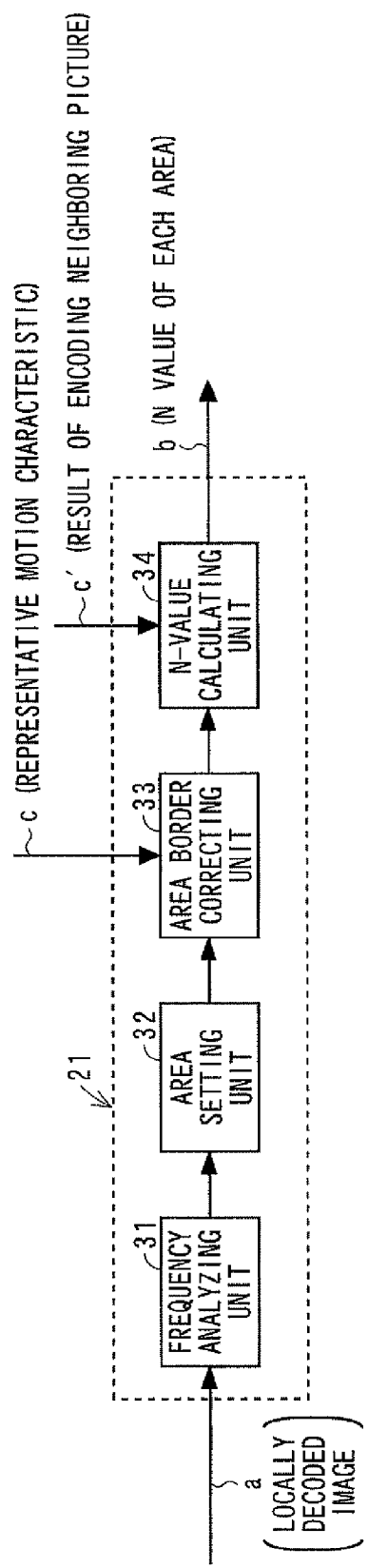
FIG. 2 is a block diagram of a first embodiment of the invention.

FIG. 2 is a block diagram showing an embodiment of the maximum MB size allocating unit 21. The maximum MB size allocating unit 21 includes a frequency analyzing unit 31 performing frequency analysis on the locally decoded image (a) from the locally decoded image storing unit 11, an area setting unit 32 that sets the maximum MB size N (for example, N denotes the power of 2) based on the result of the frequency analysis, an area border correcting unit 33 that corrects the border of the area based on a representative motion characteristic (c) (for example, a motion accompanying an operation of an image capturing device such as a camera), and an N-value calculating unit 34 that calculates the N value based on a result (c') of encoding a neighboring picture (for example, a picture which is immediately preceding in terms of time). The representative motion characteristic (c) can be predicted in consideration of the statistical nature of a motion vector of the neighboring picture (for example, histogram of the MV).

The frequency analyzing unit 31 performs, for example, frequency spectrum analysis by FFT. It is known that one of features of a super high definition video is that a fluctuation in a local material characteristic is large. The area setting unit 32 can divide one frame into a plurality of areas according to the magnitudes of frequency from the result of frequency analysis of the frame. For example, one frame is divided into rectangular blocks, and the blocks are grouped based on frequency components of the blocks, thereby forming an area of similar frequency components. Since an area of high frequencies is an area where the definition of texture is high, a small maximum MB size is allocated. On the contrary, since an area of low frequencies is an area where the definition of texture is low, a large maximum MB size is allocated. Consequently, for example, as shown in FIG. 3A, the maximum MB sizes of the areas are set to N, N/2, N/4, and the like.

For example, in H.264 as one of the standard encoding methods, the MB size can be adaptively selected from seven kinds of sizes of 16 pixels×16 lines, 16 pixels×8 lines, 8 pixels×16 lines, 8 pixels×8 lines, 8 pixels×4 lines, 4 pixels×8 lines, and 4 pixels×4 lines. When the maximum MB size is N pixels×N lines, the MB sizes can be classified into the following three categories (refer to FIG. 3B), and the MB size can be adaptively selected from the categories.

Category 1: N×N
Category 2: N×N/2, N/2×N, N/2×N/2
Category 3: N/2×N/4, N/4×N/2, N/4×N/4

Figure 3A:
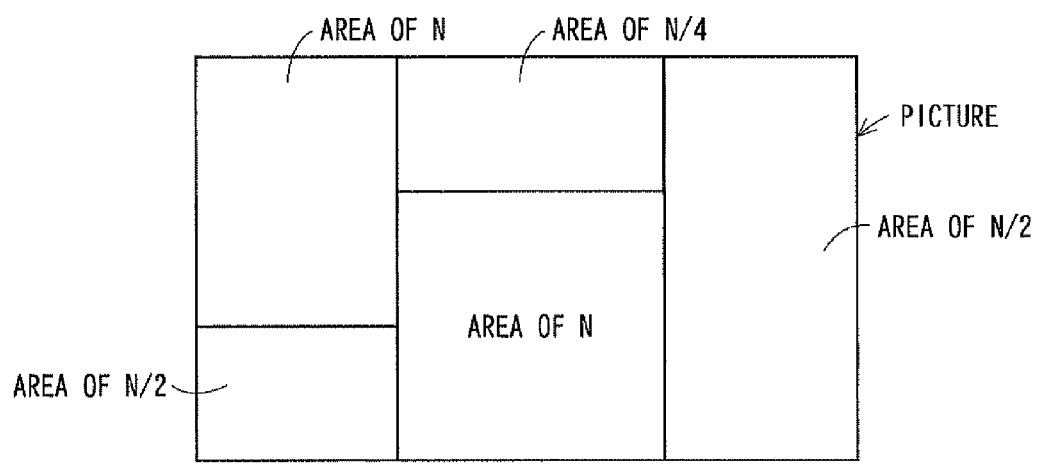
FIGS. 3A and 3B are explanatory diagrams of the maximum MB size and area division of a video.
Figure 3B:
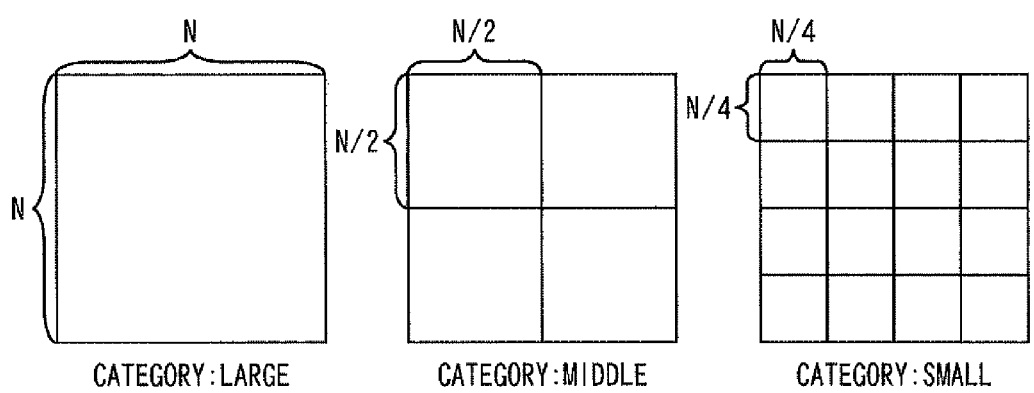

Therefore, in each of the areas in FIG. 3A, the MB size can be adaptively selected from the categories 1, 2, and 3 corresponding to large, medium, and small, respectively. For example, in an area whose maximum MB size is N/2, the MB size can be adaptively selected from categories 1' (N/2), 2' (N/4), and 3' (N/8) corresponding to the MB sizes of large, medium, and small, respectively.

In the area border correcting unit 33, by referring to, for example, MV from the first buffer memory 8, a representative motion characteristic of a video, for example, a motion accompanying an operation of an image capturing device (camera) is calculated, and the area border is corrected according to the motion characteristic. For example, when the image capturing device is moved to left or right, the area border is also corrected in accordance with the motion of the image capturing device.

Next, the N-value calculating unit 34, for example, refers to the maximum MB size in an area corresponding to an immediately preceding image (frame) and calculates the maximum MB size of the area in the frame. As the method of the patent document 1 can be used for the calculating method, the detailed description will not be repeated. In the MB size of the result of encoding of the immediately preceding frame, when the use ratio of the category of the MB size "large" is higher than a first threshold and the use ratio of the category of the MB size "small" is lower than a second threshold ("AND" in this case, alternatively, when one of the conditions is satisfied), the upper limit of the MB size of the picture is increased. On the other hand, when the use ratio of the category of the MB size "large" is lower than a third threshold and the use ratio of the category of the MB size "small" is higher than a fourth threshold ("AND" in this case, alternatively, when one of the conditions is satisfied), the upper limit of the MB size of the picture is decreased. That is, the maximum MB size (N×N) in the area is determined based on occurrence frequency of the MB encoding mode corresponding to the area in a neighboring encoded frame.

Figure 4:
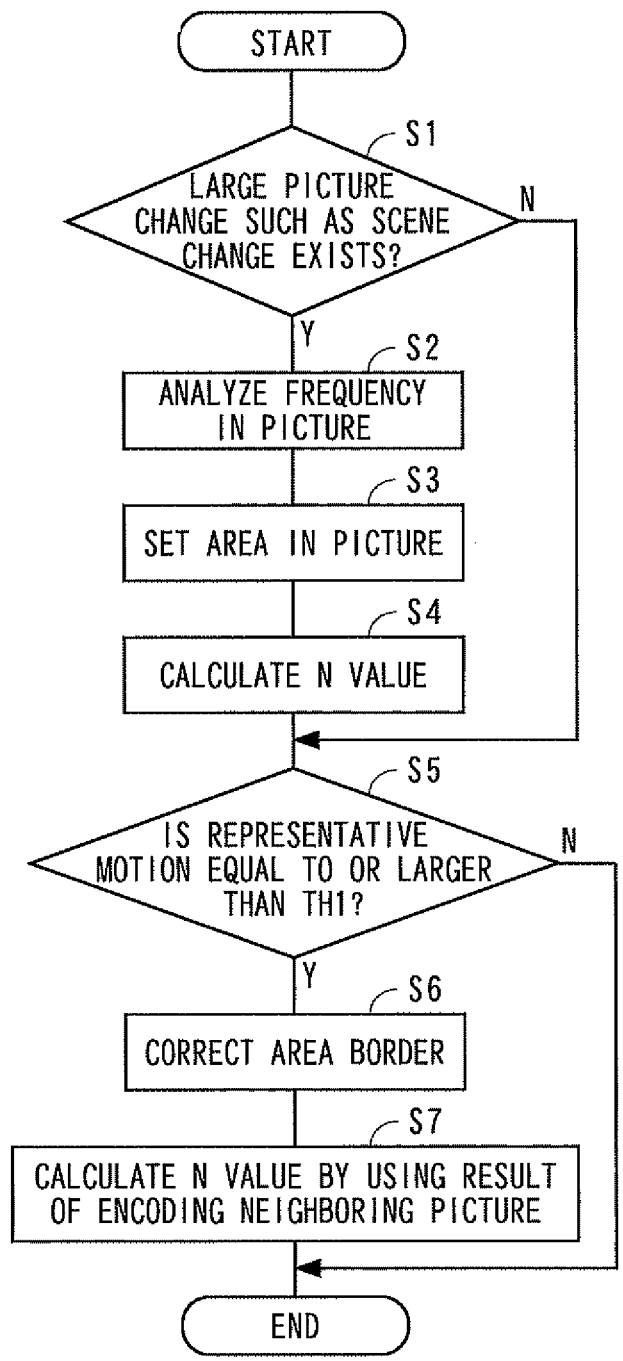
FIG. 4 is a flowchart showing operations of the first embodiment.

Next, the operations of the embodiment will be described with reference to FIG. 4. In step S1, whether there is a large picture change such as a scene change in an input image is determined. In the case where the determination is affirmative, the procedure advances to step S2 where the frequency analyzing unit 31 analyzes the frequency of the image in the picture. In step S3, an area in the picture is set (refer to FIG. 3B) based on the result of the frequency analysis. In step S4, based on the result of the frequency analysis, an N value corresponding to the maximum MB size is calculated. Generally, it is considered that a large area of high frequency component is an area where definition of texture is high, so that a small N value is calculated. On the contrary, it is considered that a small area of high frequency component is an area where the definition of texture is low, so that a large N value is calculated. In the case where the determination in step S1 is negative, steps S2 to S4 are skipped and the procedure advances to step S5. After the process in step S4, the procedure advances to step S5.

In step S5, whether the representative motion of the video is equal to or larger than a predetermined threshold TH1 is determined. In the case of Yes, the procedure advances to step S6 where the area border is corrected. Next, in step S7, an N value is calculated by using a result of encoding an image in a neighboring picture (for example, an immediately preceding frame). In the case where determination in step S5 is negative, steps S6 and S7 are skipped. The N value (b) of each area obtained as described above is transmitted to the motion detecting unit 2 and used for the motion detection of the video.

As described above, in the embodiment, the optimum MB size can be calculated area by area in a frame. Therefore, the coding efficiency can be improved also in a video in which fluctuation of a local material characteristic is large like a super high definition video. In the embodiment, without transmitting information (side information) of the maximum MB size (N) of each area in a frame to the decoder, the decoder can perform decoding by calculating the maximum MB size (N) of each area in the frame from a decoded image of which size is the same as that calculated by the encoder. Therefore, it is unnecessary to transmit the side information to the decoding side. Also from this viewpoint, the coding efficiency can be improved.

Figure 5:
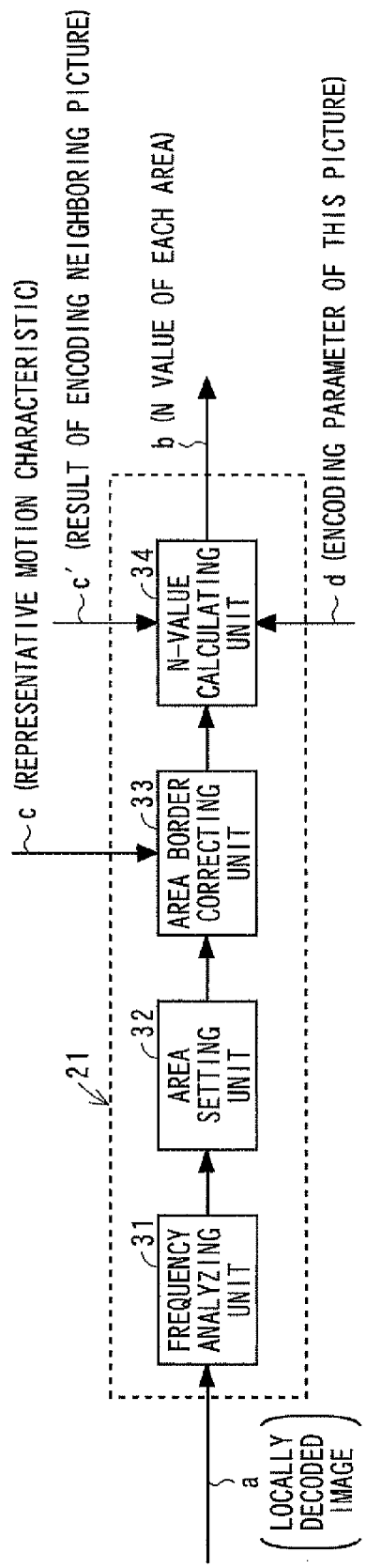
FIG. 5 is a block diagram of a second embodiment of the invention.

Next, a second embodiment of the present invention will be described with reference to FIG. 5. In FIG. 5, the same reference numerals as those of FIG. 2 denote the same or equivalent components. The second embodiment differs from the first embodiment in that the N-value calculating unit 34 calculates an N value from a result (c') of encoding a neighboring picture and an encoding parameter (d) of the picture (as a concrete example, a quantization step size of each area). Alternatively, the N value may be calculated only from the encoding parameter (d) of the picture as the latter one. For example, with reference to the result (c') of encoding a neighboring picture, a DCT coefficient coding amount of each of the areas of the picture is predicted for each of N values. Referring to an N value which gives the minimum coding amount, the maximum MB size of each area corresponding to the picture can be changed to a (2×N) value or a (½×N) value or can be unchanged.

Also in the embodiment, without transmitting information (side information) of the maximum MB size (N) of each area in an image to the decoder, the decoder can perform decoding by calculating the maximum MB size (N) of each area from a decoded image under the same condition as that in the case of coding. Therefore, it is unnecessary to transmit the side information to the decoding side. Also from this viewpoint, the coding efficiency can be improved.

Figure 6:
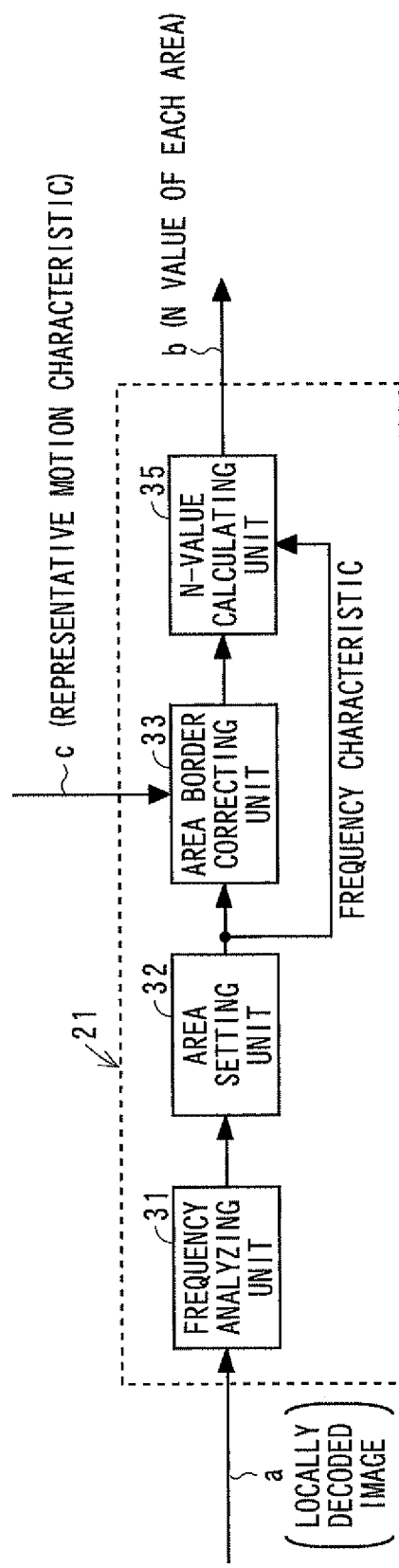
FIG. 6 is a block diagram of a third embodiment of the invention.

Next, a third embodiment of the present invention will be described with reference to FIG. 6. In FIG. 6, the same reference numerals as those of FIGS. 2 and 5 denote the same or equivalent components. The third embodiment differs from the first embodiment, because, in the third embodiment, an N-value calculating unit 35 calculates an N value based on a result of frequency analysis (frequency spectrum) performed by the frequency analyzing unit 31 without referring to the result of encoding the image in the neighboring picture like the first embodiment.

Also in the embodiment, it is unnecessary to transmit information (side information) of the maximum MB size (N) of each area in an image to the decoder.

Figure 7:
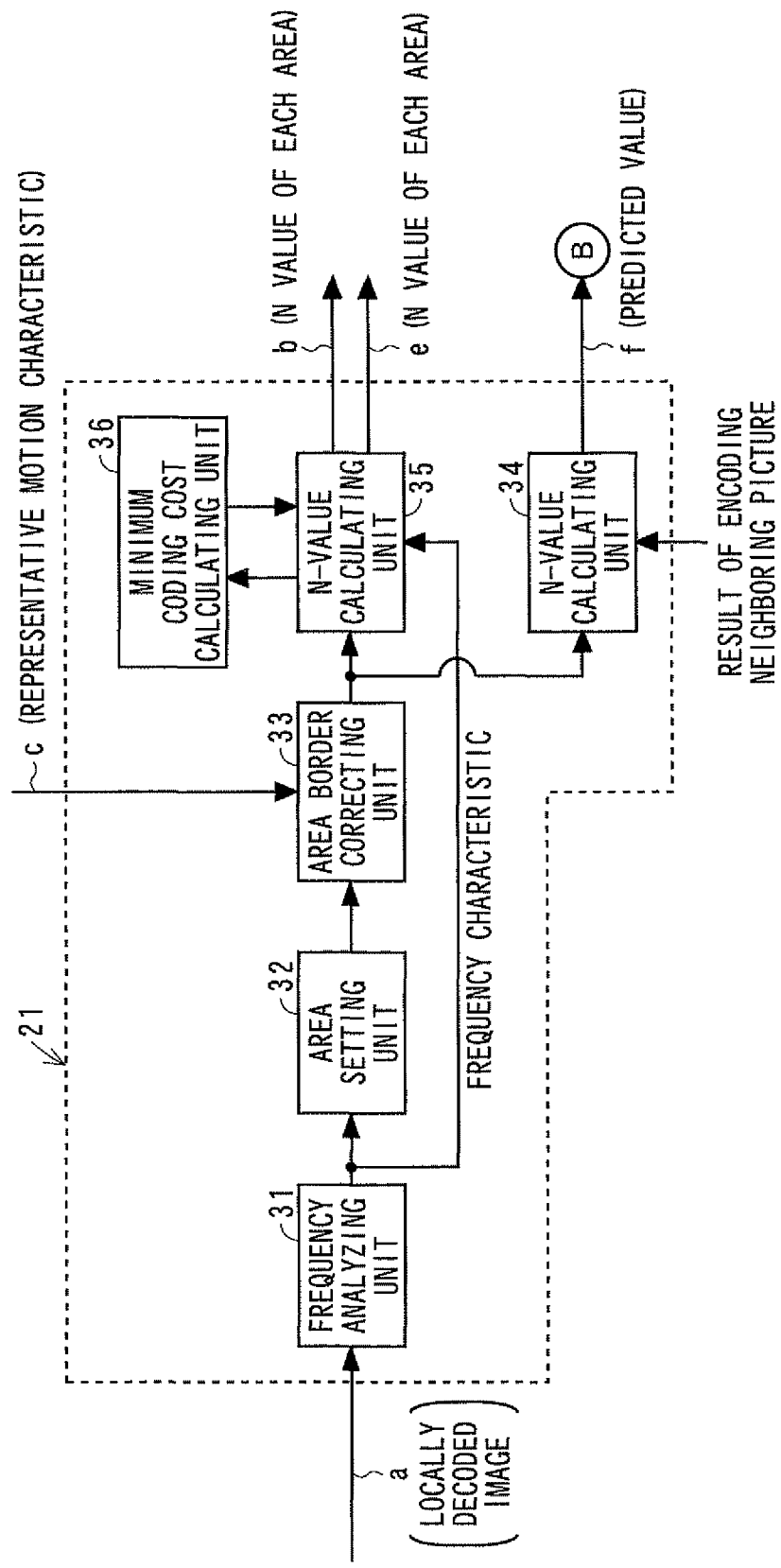
FIG. 7 is a block diagram of a fourth embodiment of the invention.

Next, a fourth embodiment of the present invention will be described with reference to FIG. 7. In FIG. 7, the same reference numerals as those of FIGS. 2, 5 and 6 denote the same or equivalent components. The fourth embodiment differs from the third embodiment in that the maximum N value of each area (for example, N, N/2, and N/4 in FIG. 3A) calculated by the N-value calculating unit 34 is transmitted to a minimum coding cost calculating unit 36 and an N value determined as the smallest coding cost in the minimum coding cost calculating unit 36 is determined the N-value of each area and that the N value calculated by the N-value calculating unit 34 of the first embodiment is set as a predicted value (f). The point is similar to the third embodiment that the N-value calculating unit 35 calculates an N value of each area based on a result of frequency analysis (frequency spectrum) performed by the frequency analyzing unit 31.

The N values (b) and (e) of the minimum coding cost are transmitted to the motion detecting unit 2 in FIG. 1 and also transmitted as side information to the update information determining unit 22. The predicted value (f) is transmitted to an error signal generator 41 in FIG. 8. As the predicted value (f), the N value calculated by any of the N-value calculating units 34 and 35 of the first to third embodiments can be set as a predicted value. That is, the N-value calculating unit 34 can calculates the N value as the predicted value (f) by using at least one of frequency of occurrence of the MB coding mode corresponding to the area in a neighboring encoded frame, a rate distortion characteristic of the DCT coefficient corresponding to the area in a neighboring encoded frame, and the frequency spectrum of the area in the frame.

Figure 8:
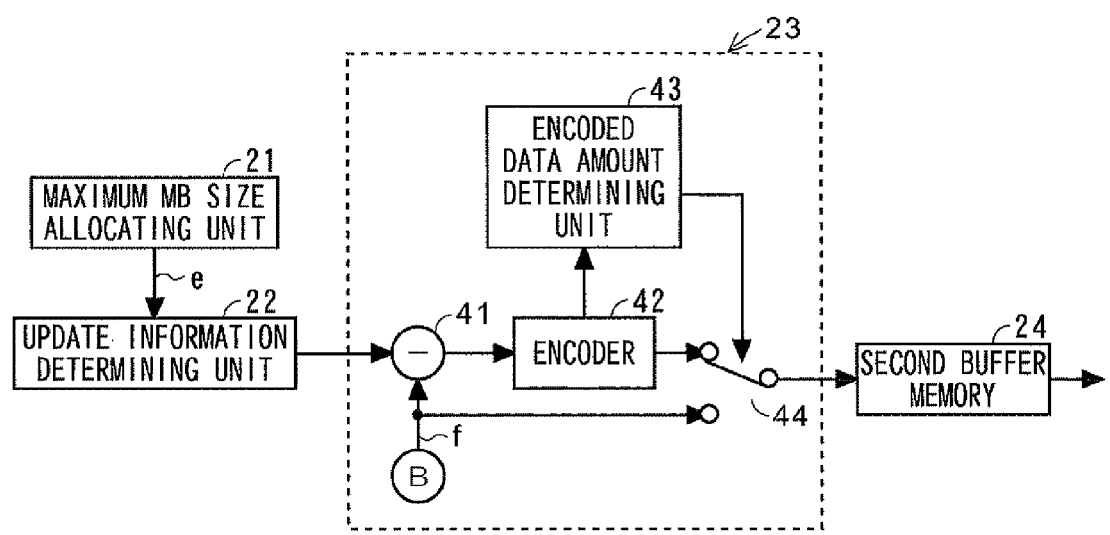
FIG. 8 is a block diagram showing a concrete example of an update information coding unit in the fourth embodiment.
Figure 1:
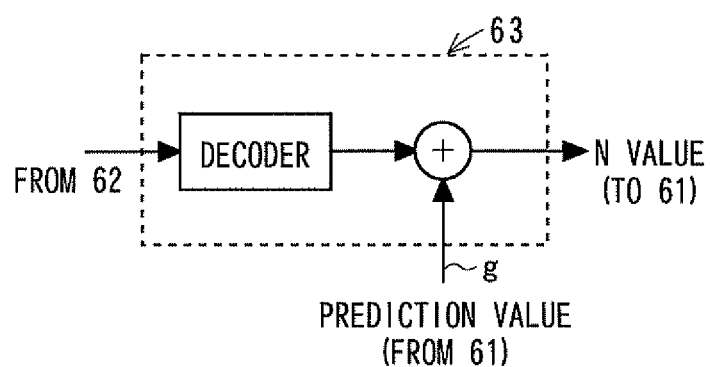

FIG. 8 shows a method of reducing the data amount of the side information. When the N value in an area is changed from the N value of the area of a preceding image, the update information determining unit 22 sets the value as updated information. In the case where the N value is unchanged, the update information determining unit 22 does not set the value as updated information. The updated information output from the update information determining unit 22 is transmitted to the update information encoder 23. The update information encoder 23 has the error signal generator 41, an encoder 42, an encoded data amount determining unit 43, and a selecting unit 44. The side information after the encoding is temporarily stored in the second buffer memory and, after that, sent to the multiplexing unit 12, and multiplexed with an encoded image from the first buffer memory 8. The multiplexed image is transmitted to a line.

Next, the operations of the fourth embodiment will be described with reference to the flowchart of FIG. 9. Since steps S1 to S5 of FIG. 9 are the same as those of FIG. 4, their description will not be repeated. Description will be given from step S11 after a representative motion occurs. In step S11, the frequency in the picture is analyzed. In step S12, the area border correcting unit 33 corrects an area border. In step S13, the N value calculated by the N-value calculating unit 35 is transmitted to the minimum encoding cost calculating unit 36 where the N value of the minimum encoding cost is determined. The minimum encoding cost calculating unit 36 sets, as the N value of the minimum encoding cost, an N value at which the encoding data amount becomes the minimum in the case of performing encoding with each of N values received from the N-value calculating unit 35. The N value is transmitted as N values (b) and (e) of the minimum encoding cost to the motion detecting unit 2 in FIG. 1 and also to the update information determining unit 22 in FIG. 8. In step S14, in the N-value calculating unit 34 in FIG. 7, an N value is calculated in a manner similar to the first embodiment, and set as a prediction value (f). In step S15, the N value of the minimum encoding cost output from the update information determining unit 22 and the N value as the prediction value (f) output from the N-value calculating unit 34 are input to the error signal generator 41, and an error signal is output from the error signal generator 41. The error signal is encoded by the encoder 42. The encoded data is transmitted to the encoded data amount determining unit 43 where the determination in step S16 is made. That is, whether the encoded data amount is equal to or less than a predetermined threshold TH2 is determined. In the case of Yes in the determination, the data mount can be reduced. The procedure advances to step S17 where the encoded data of the error information is output to the second buffer memory 24. On the other hand, in the case of No in the determination in step S16, the procedure advances to step S18 where the N value of the minimum cost is output as it is without being encoded. That is, in the case where the data amount can be reduced, the selecting unit 44 selects the encoder 42. In the case where the data amount cannot be reduced, without generating a code, the prediction value is used as it is.

According to the embodiment, the update information of the N value, that is, the side information can be encoded and transmitted to the decoder side, so that the optimum N value can be given with reliability.

An embodiment of a decoder corresponding to the encoder of the present invention will be described with reference to FIG. 10. FIG. 10 is a block diagram showing a schematic configuration of the decoder. Encoded data output from the encoder of FIG. 1 is received by a decoder of FIG. 10. An error signal of an image is stored in a first buffer memory 51, and side information as the N value update information is stored in a second buffer memory 62.

The error signal of the image is transmitted to a variable-length decoder 52 and is variable-length decoded to the quantization level, and the resultant signal is transmitted to an inverse-quantization unit 53 and is subjected to inverse quantization. Subsequently, the signal is transmitted to an inverse DCT unit 54 where it is subjected to inverse DCT, and the resultant is transmitted to an adder 55. The adder 55 adds a predicted image signal from a predicted image storing unit 57 to the error signal to generate a decoded image. The decoded image is temporarily stored in a decoded image storing unit 56 and is output as a video output.

The configuration of the maximum MB size allocating unit 61 is the same as that shown in FIGS. 2, 5, and 6 as a configuration corresponding to the encoder of the first, second, and third embodiments. On the other hand, as the configuration corresponding to the encoder of the fourth embodiment, the maximum MB size allocating unit 61 receives side information decoded by an update information decoder 63, and just transmits it to a motion compensating unit 58. In the following, the configuration and/or the operation of the maximum MB size allocating unit 61 will be described in correspondence with the embodiments.

In the case of decoding data encoded by the encoder of the first embodiment, the maximum MB size allocating unit 61 analyzes the frequency of a decoded image from the decoded image storing unit 56 and, based on the result of the analysis, sets an area in the picture. Subsequently, the maximum MB size allocating unit 61 obtains a motion vector MV from the first buffer memory 51 and corrects an area border from a representative motion characteristic. According to a result of encoding a neighboring picture from the first buffer memory 51, the N value of each area is calculated. The N value of each area is sent to the motion compensating unit 58. The motion compensating unit 58 divides the decoded image from the decoded image storing unit 56 into MBs of the N value, generates a prediction image obtained by compensating motion using the MV from the first buffer memory 51, and temporarily stores the prediction image into the prediction image storing unit 57. As described above, the prediction image stored in the prediction image storing unit 57 is transmitted to the adder 55 where it is added with the error signal from the inverse DCT unit 54, thereby generating a decoded image.

In the case of decoding data encoded by the encoder of the second embodiment, since data of the encoding parameter (d) of the picture is obtained from the first buffer memory 51, the maximum MB size allocating unit 61 calculates an N value by using the result of encoding the neighboring picture and the encoding parameter of the picture. The following decoding operation is as described above.

In the case of decoding data encoded by the encoder of the third embodiment, the maximum MB size allocating unit 61 analyzes the frequency of a decoded image from the decoded image storing unit 56 and, based on the result, determines the N value of an area in the picture. The following decoding operation is as described above.

As described above, in the case of decoding data encoded by any of the encoders of the first to third embodiments, the encoded data can be decoded without the side information.

The case of decoding data encoded by the encoder of the fourth embodiment will now be described. In this case, the maximum MB size (N) of each area in a picture is determined by decoding side information of reception encoded data.

The update information of the N value of the maximum MB size encoded by the update information encoder 23 in FIG. 8 is temporarily stored in the second buffer memory 62 of the decoder of FIG. 10. The update information is transmitted to the update information decoder 63 and decoded. The decoding is performed by obtaining an error signal of an N value by decoding of the encoded data, obtaining the prediction value (g) calculated by using at least one of frequency of occurrence of an MB coding mode corresponding to the area in a neighboring encoded image, a rate distortion characteristic of a DCT coefficient corresponding to the area in a neighboring encoded image, and a frequency spectrum of the area in the image, and adding the prediction value (g) to the error signal. The decoded update information, that is, the maximum MB size (N value) is transmitted to the maximum MB size allocating unit 61 and is transmitted as an N value of each area from the maximum MB size allocating unit 61 to the motion compensating unit 58. FIG. 11 shows a concrete example of the update information decoder 63.

The high-efficiency video encoder and decoder of the present invention can be used for compression transfer and decompression of an HDTV and a super high definition video.

What is claimed is:

1. A video encoder capable of locally updating a maximum value of an MB size as a unit of motion-compensated prediction of an encoding process in a picture, comprising:
   a frequency analyzing unit performing frequency analysis on a locally decoded image;
   an area setting unit which sets a local area in a picture of the locally decoded image to which a maximum MB size is applied, based upon an area of similar frequency components from the frequency analyzing unit;
   an N-value calculating unit which determines the maximum MB size (N×N) of each area in the locally decoded image set by the area setting unit (here, N is a positive integer); and
   a motion detecting unit detecting a motion of the locally decoded image in accordance with the maximum MB size (N×N) determined by the N-value calculating unit;
   wherein:
   in the determination of the maximum MB size (N×N) of each area which is set, the N-value calculating unit calculates an N value by using frequency of occurrence of an MB coding mode corresponding to the area in a neighboring encoded image;
   when the N value changes, the N value is set as updated information, and the update information is encoded on an error signal that sets, as a predicted value, the N value calculated by using at least one frequency of occurrence of an MB coding mode corresponding to the area in a neighboring encoded image, a rate distortion characteristic of a DCT coefficient corresponding to the area in a neighboring encoded image, and a frequency spectrum of the area in the image; and
   the update information is encoded only when an encoded bit amount of the update information is below a predetermined threshold.

2. The video encoder according to claim 1, further comprising an area border correcting unit which corrects a border of the area set by the area setting unit, wherein the area border correcting unit corrects the area border based on a representative motion characteristic.

3. The video encoder according to claim 2, wherein the representative motion characteristic is obtained by estimating motion in consideration of a statistical nature of a motion vector in an encoded image which is neighboring in terms of time.

4. The video encoder according to claim 1, further comprising a unit which calculates an N value which minimizes encoding cost of the picture, wherein the N-value calculating unit determines, as the N value, an N value which minimizes encoding cost of the picture calculated by the unit.

5. The video encoder according to claim 4, wherein when there is no change in the N value, the N value is not set as update information.

* * * * *